(12) United States Patent
Ji et al.

(10) Patent No.: US 10,151,871 B2
(45) Date of Patent: Dec. 11, 2018

(54) ULTRA-THIN LED BAR LIGHTS

(71) Applicants: Self Electronics Co., Ltd., Ningbo, Zhejiang (CN); Wanjiong Lin, Ningbo, Zhejiang (CN); Self electronics USA Corporation, Norcross, GA (US)

(72) Inventors: Feng Ji, Zhejiang (CN); Zhaoyong Zheng, Zhejiang (CN)

(73) Assignee: Self Electronics Co., Ltd., Ningbo (CN)

( * ) Notice: Subject to any disclaimer, the term of this patent is extended or adjusted under 35 U.S.C. 154(b) by 0 days.

(21) Appl. No.: 15/699,600

(22) Filed: Sep. 8, 2017

(65) Prior Publication Data

US 2018/0074253 A1 Mar. 15, 2018

(30) Foreign Application Priority Data

Sep. 13, 2016 (CN) .......................... 2016 1 0817335

(51) Int. Cl.
*F21S 4/28* (2016.01)
*F21V 8/00* (2006.01)
(Continued)

(52) U.S. Cl.
CPC .............. *G02B 6/0055* (2013.01); *F21S 4/28* (2016.01); *F21V 9/30* (2018.02); *G02B 6/009* (2013.01); *G02B 6/0016* (2013.01); *G02B 6/0043* (2013.01); *G02B 6/0068* (2013.01); *G02B 6/0073* (2013.01); *G02B 6/0085* (2013.01); *F21V 15/015* (2013.01); *F21V 29/507* (2015.01); *F21V 29/89* (2015.01); *F21W 2131/40* (2013.01); *F21W 2131/405* (2013.01); *F21Y 2103/10* (2016.08); *F21Y 2115/10* (2016.08); *G02B 6/0093* (2013.01)

(58) Field of Classification Search
CPC ........ F21S 4/28; F21V 15/015; F21V 29/507; G02B 6/0011; G02B 6/0055; G02B 6/0068; G02B 6/0085; G02B 6/009; G02B 6/0091; G06F 1/1658; G06F 1/183; G02F 1/133615; G02F 2001/133314; G02F 2001/133628
See application file for complete search history.

(56) References Cited

U.S. PATENT DOCUMENTS 9,280,011 B2 * 3/2016 Ikuta .......................... H04N 5/64
2014/0247397 A1 * 9/2014 Ozeki ............... G02F 1/133615
348/725

(Continued)

*Primary Examiner* — Hargobind S Sawhney
(74) *Attorney, Agent, or Firm* — Wang Law Firm, Inc.

(57) ABSTRACT

A ultra-thin LED bar lights includes a bar house, a light module, a reflection film, a light guide plate, and a cover having a light transmittance less than 90%. An angle between the circuit board and the accessory placed board being larger than 80 degrees and less than 90 degrees. The light guide plate includes an incidence wall for receiving the emitted light of the light module, three reflective walls for reflecting light, and a diffusion surface contacting with the reflection film. A width of the diffusion surface of the light guide plate is between 3 times or 4 times the length or the maximum diameter of the LED chips and provides a plurality of light guide points thereon. The light guide points include a plurality of spaced apart circular dots, the total area of which is 50% to 55% of the total area of the diffusion surface.

10 Claims, 3 Drawing Sheets

(51) Int. Cl.
*F21V 9/30* (2018.01)
*F21Y 103/10* (2016.01)
*F21Y 115/10* (2016.01)
*F21V 15/015* (2006.01)
*F21W 131/40* (2006.01)
*F21W 131/405* (2006.01)
*F21V 29/507* (2015.01)
*F21V 29/89* (2015.01)

(56) References Cited

U.S. PATENT DOCUMENTS

2015/0226997 A1* 8/2015 Tomomasa ........ G02F 1/133308
　　　　　　　　　　　　　　　　　　　　348/794
2018/0101043 A1* 4/2018 Chen ................ G02F 1/133305

* cited by examiner

ULTRA-THIN LED BAR LIGHTS

RELATED APPLICATION

This present application claims benefit of Chinese Application, CN201610817335.1, filed on Sep. 13, 2016 with the State Intellectual Property Office of the People's Republic of China, the entirety of which is incorporated by reference herein.

BACKGROUND

1. Technical Field

The present application relates to a lighting equipments, and more particularly to an ultra-thin LED bar lights.

2. Description of the Related Art

For years, people have used traditional incandescent or fluorescence lighting apparatus in order to address their interior lighting concerns. However, such lighting apparatuses present a number of drawbacks. For example, the popular halogen apparatus presents the following drawbacks, such as relatively high power consumption, inefficiency of light dispersion due to the placement of its metal shield in the line sight of the halogen bulb, and its limited effectiveness in preventing glare from the halogen bulb.

Recently, a number of LED lighting apparatuses have been designed to replace the halogen apparatus, as well as other traditional incandescent or fluorescence lighting apparatuses. Especially, the LED lighting apparatuses are used in the super market, exhibition hall, museum, and so on because of long-life and energy-saving thereof. In some special situation, such as freezer, storage racks, exhibition cabin, and so on, special location cannot be reserved for installing the LED lighting apparatuses during manufacturing it, and the LED lighting apparatuses is often installed onto the special situation later. Therefore, in order not to make users feel unexpectedness and glare, the LED lighting apparatuses are designed into thin and small and have sufficient brightness.

Therefore, it is necessary to provide an ultra-thin LED bar lights which makes it possible to solve the above problem.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout two views.

DETAILED DESCRIPTION

The present application is illustrated by way of example and not by way of limitation in the figures of the accompanying drawings. It should be noted that references to "an" or "one" embodiment in this application are not necessarily to the same embodiment, and such references mean at least one.

Figure 1:
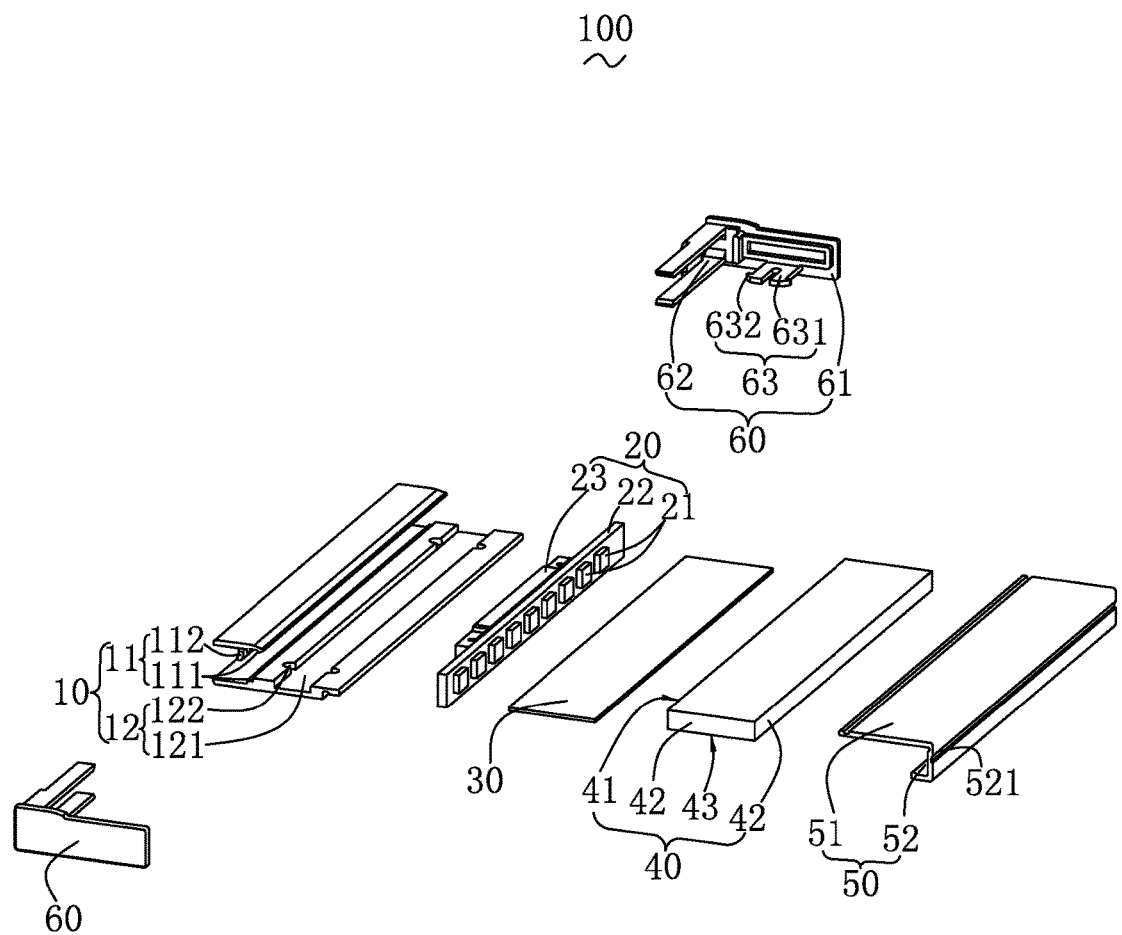
FIG. 1 is an explored view of an ultra-thin LED bar lights according to an embodiment.
Figure 2:
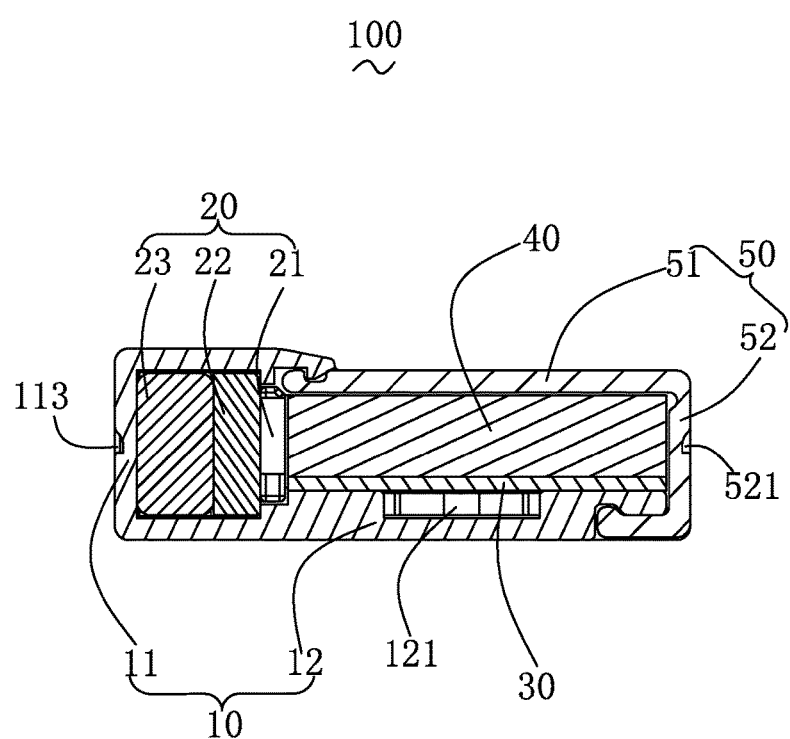
FIG. 2 is an explored view of the ultra-thin LED bar lights of FIG. 1.
Figure 3:
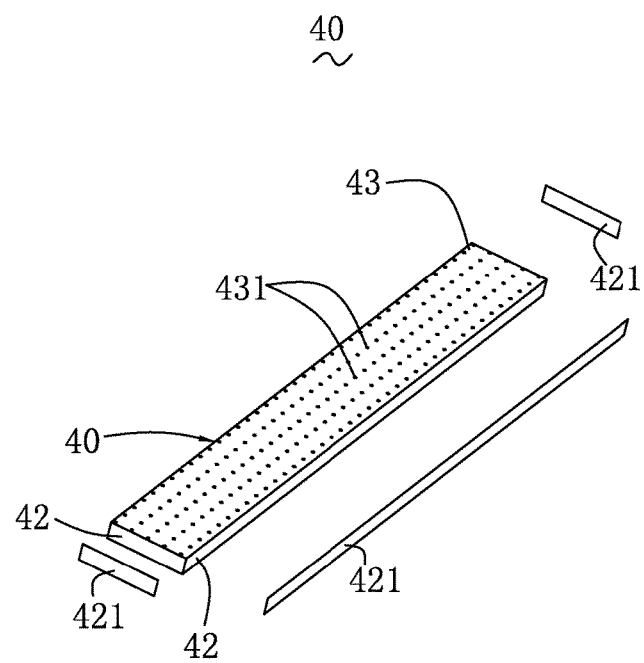
FIG. 3 is an isometric view of a light guide plate of the ultra-thin LED bar lights of FIG. 1.

Referring to FIG. 1 to FIG. 3, an ultra-thin LED bar lights 100 is shown. The ultra-thin LED bar lights 100 includes a bar house 10, a light module 20 received in the bar house 10, a reflection film 30 arranged on the bar house 10, a light guide plate 40 mounted on the reflection film 30, a cover 50 disposed on the light guide plate 40 along the light emitting direction thereof, and two end covers 60 assembled on two ends of the bar house 10 respectively. As well known to a person skilled in the art, the ultra-thin LED bar lights 100 further includes other function modules, such as wires subassembly, electrical plug component, installation subassembly, and so on, which no need to described in detail.

The bar house 10 includes a light source mounting groove 11, and an accessory placed board 12 connected to one side wall of the light source mounting groove 11. In order to heat dissipation, the bar house 10 may be made of thermal materials, such as metal, thermal plastic, and so on. In the present embodiment, the bar house 10 is made of aluminum alloy. The light source mounting groove 11 is configured for mounting the light module 20. Therefore, a width of the light source mounting groove 11 is equal to that of the light module 20. For clamping the light module 20, two side walls of the light source mounting groove 11 are respectively provided with two ribs 111 which are configured to clamp and assemble the light module 20 together with a bottom of the light source mounting groove 11. Two notches 112 are respectively opened on two ends of the bottom of the light source mounting groove 11 so as to draw forth wires of the electrical plug component. In order to fix the end covers 60, a slot 121 is provided on the accessory placed board 12. Two U-shaped grooves 122 are respectively provided on a side wall of two ends of the slot 121. The notch 112, the slot 121, and the U-shaped groove 122 will be described in detail together with the lower end cover 60

The light module 20 includes a plurality of LED chips 21, a circuit board 22 for arranged the LED chips 21, and a heat dissipation bar 23 mounted on the circuit board 22. The LED chips 21 are solid-state semiconductor device capable of converting electrical energy into visible light, and can directly convert electricity into light energy and have characteristics of energy saving, cold light and small volume which are well known for a person skilled in the art and not are described in detail. The circuit board 22 may be a printed circuit board and is used to supply source for each of the LED chips 22. The structure and working principle of the circuit board 22 itself is the prior art and will not be described in detail. The circuit board 22 abuts against the two ribs 111 of the light source setting groove 11 so as to fix the light module 20 together with the bottom of the light source setting groove 11. An angle between the circuit board 22 and the accessory placed board 12 is greater than 80 degrees and less than 90 degrees so that the emitted light of the light source module 20 can be more irradiated on the accessory placed board 12. In the present embodiment, the angle between the circuit board 22 and the accessory placed board 12 is 85 degrees. In order to block glare, the circuit board 22 is spaced from an opening of the light source mounting groove 22 so as to prevent the emitted light of the LED chips 21 from emitting from a gap between the LED chips 21 and the light guide plate 40 in which the glare may be formed. A white reflective ink is coated onto the surface of the circuit board 22 in which the LED chips 21 are arranged. The white reflective ink is configured for reflecting the emitted lights of the LED chips 21 back which irradiate onto the circuit board 22 so as to improve light efficiency. The heat dissipation bar 23 is pasted on the circuit board 22 and contacts with three side walls of the light source groove 11 so as to facilitate the heat transfer of the LED chips 21 as much and quick as possible. The heat dissipation bar 23 is made of thermal materials, such as metal.

The reflection film 30 is configured for reflecting the light irradiated to the accessory placed board 12 to the light guide plate 40. Since the emitted light of the LED chips 21 is non-scattered light, and mostly direct light, it is necessary to disrupt the direct light into scattered light so as to make the light on the exit surface of the ultra-thin LED bar lights 100 uniform. Therefore, the reflection film 30 is a diffuse reflective film and is made of a reflective material on paper. The reflective material is subjected to a random coating.

Referring to FIG. 3 together, the light guide plate 40 is mounted on the reflection film 30 and includes an incidence wall 41 for receiving the emitted light of the light module 20, three reflective walls 42 for reflecting light, and a diffusion surface 43 contacting with the reflection film 30. The light guide plate 40 itself is a prior art and is generally made of an optical grade acrylic/PC sheet and has a thickness equal to the width or the maximum diameter of the LED chip 21. The incidence wall 41 is in close contacted with a plurality of LED chips 21 of the light module 20 to receive light emitted from the LED chips 21. Three reflective layers 421 are respectively coated on the three reflection walls 42. Each of the three reflective layers 421 is a diffuse reflective paper. A plurality of light guide points 431 are provided on the diffusion surface 43. The light guide points 431 are printed on the light guide plate 40 in via of UV (ultraviolet) screen printing technology in use of material with extremely high reflectivity and no light absorption. When light irradiate onto the light guide points 431, the reflected light thereof spreads towards each angle so as to destroy the reflex condition of the diffusion surface 43. Finally, the reflected light is emitted from the exit surface of the light guide plate 40. The light guide plate 40 can have a uniform light emitting surface by providing the degree of density of the light guide point 431 thereon. In the present invention, the light guide point 431 includes a plurality of spaced apart circular dots, the total area of which is 50% to 55% of the total area of the diffusion surface 43.

The cover 50 is arranged in the light emitting direction of the light guide plate 40 and configured to prevent the light guide plate 40 from wearing and form a closed space for assembling the light guide plate 40, the reflection film 30, and the two end covers 60. The cover 50 includes a light exit side 51 and a clamping slot 52 having a side edge connected to the light exit side 51. The light exit side 51 is arranged in the light emitting direction of the light guide plate 40 and one edge of the light exit side 51 may be inserted into inner side wall of the light source groove 11 for fixing the light exit side 51. The clamping slot 52 is clamped in the accessory placed board 12 of the bar house 10 so as to assemble the cover 50 onto the bar house 10. Because the ultra-thin LED bar lights 100 only has one light emitting surface, and a thickness of the light guide plate 10 is equal to a length or maximum diameter of the LED chips 21, and a width of the light guide plate 40 is between 3 times or 4 times the length or the maximum diameter of the LED chips 21, it is necessary that a light transmittance of the cover 50 is less than 90% so as to prevent glare. A first mounting groove 521 and a second mounting groove 113 are respectively provided on the outer side walls of the clamping slot 52 and the light mounting groove 11 for installing the ultra-thin LED bar lights 100

The two end covers 60 are inserted in the two ends of the ultra-thin LED bar lights 100 respectively and include a bottom 61, a threading groove 62 extending from the bottom 61, and a catching jaw 63 extending from the bottom 61. As the end covers 60 have a complex structure, it is suitable for plastic and other plastic materials made of injection molding. The bottom 61 covers a rectangle frame formed by the bar house 60 and the cover 50 and so the entire lighting assembly is completed. The threading groove 62 is received in the notches 112 of the bar house 10 so that the electrical plug component, which electrically connected to the circuit board 22, can be extended to the outside of the ultra-thin LED bar lights 100 to be connected to an external power source. The catching jaw 63 is inserted in the slot 121 of the accessory placed board 12 of the bar house 10 and is clamped on the U-shaped groove 122. As is shown in figures, the catching jaw 63 includes two elastic bars 631 and two protrudes 632 respectively arranged on two ends of the elastic bars 631. The two protrudes 632 are respectively clamped into the U-shaped grooves 122 so as to fix the relative location of the end covers 60.

As described above, the ultra-thin LED bar lights 100 may have little thickness and very good light effect and has no glare so as to increase the user experience effect by setting the angle between the light exit direction of the light module 20 and the reflection film 30 and the light guide plate 40, the relationship between the width of the diffusion surface 43 of the light guide plate 40 and the light transmittance of the cover 50, and the relationship between the width of the diffusion surface of the light guide plate 40 and the density of the light guide point 431 on the light guide plate 40.

While the disclosure has been described by way of example and in terms of exemplary embodiment, it is to be understood that the disclosure is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An ultra-thin LED bar lights, comprising:
   a bar house, the bar house comprising a light mounting groove, and an accessory place board connected to one side wall of the light mounting groove;
   a light module received in the bar house, the light module comprising a circuit board and a plurality of LED chips, an angle between the circuit board and the accessory placed board being larger than 80 degrees and less than 90 degrees;
   a reflection film arranged on the bar house, the reflection film being a diffuse reflective film and mounted on the accessory placed board;
   a light guide plate provided on the reflection film, the light guide plate comprising an incidence wall for receiving the emitted light of the light module, three reflective walls for reflecting light, and a diffusion surface contacting with the reflection film, a width of the diffusion surface of the light guide plate being between 3 times or 4 times the length or the maximum diameter of the LED chips and providing a plurality of light guide points thereon, the light guide points comprising a plurality of spaced apart circular dots, the total area of which is 50% to 55% of the total area of the diffusion surface; and
   a cover arranged on the light emitting direction of the light guide plate and has a light transmittance less than 90%.

2. The ultra-thin LED bar lights as claimed in claim 1, wherein a white reflective ink is coated onto the surface of the circuit board in which the LED chips are arranged.

3. The ultra-thin LED bar lights as claimed in claim 1, wherein two notches are respectively opened on two ends of the bottom of the light source mounting groove, a slot is provided on the accessory placed board, two U-shaped groove are respectively provided on a side wall of two ends of the slot.

4. The ultra-thin LED bar lights as claimed in claim 3, wherein the ultra-thin LED bar lights further comprises two end covers mounted two end of the bar house, each of the two end covers comprises a bottom, a threading groove extending from the bottom, and a catching jaw extending from the bottom, the threading groove is received in the notch, the catching jaw is inserted in the slot and is clamped into the U-shaped groove.

5. The ultra-thin LED bar lights as claimed in claim 1, wherein the circuit board is spaced apart from the notches.

6. The ultra-thin LED bar lights as claimed in claim 1, wherein the light module further comprises a heat dissipation bar mounted on the circuit board, the heat dissipation bar is coated on the circuit board and contacts with the side wall of the light source mounting groove.

7. The ultra-thin LED bar lights as claimed in claim 1, wherein the angle between the circuit board and the accessory placed board is 85 degrees.

8. The ultra-thin LED bar lights as claimed in claim 1, wherein the cover comprises a light exit side, and a clamping slot having a side edge connected to the light exit side, the light exit side is arranged on the light emitting direction of the light guide plate, the clamping slot is clamped onto the accessory placed board, a side edge of the light exit side is clamped on an inner side wall of the light source mounting groove.

9. The ultra-thin LED bar lights as claimed in claim 8, wherein a first mounting groove and a second mounting groove are respectively provided on the outer side walls of the clamping slot and the light mounting groove for installing the ultra-thin LED bar lights.

10. The ultra-thin LED bar lights as claimed in claim 1, wherein a thickness of the light guide plate is equal to a width or maximum diameter of the LED chips.

* * * * *